United States Patent
Wanlass

[15] 3,699,716
[45] Oct. 24, 1972

[54] CLOSURE MOUNTING MEANS

[72] Inventor: Bert R. Wanlass, Warren, Mich.

[73] Assignee: General Motors Corporation, Detroit, Mich.

[22] Filed: Sept. 16, 1970

[21] Appl. No.: 72,685

[52] U.S. Cl. ..........................49/40, 49/41, 49/374
[51] Int. Cl. ..............................................E06b 3/44
[58] Field of Search..........49/40, 349, 440, 348, 372, 49/374, 41; 296/50, 57, 57 A

[56] References Cited

UNITED STATES PATENTS

| | | | |
|---|---|---|---|
| 1,829,224 | 10/1931 | Kitmiller | 49/40 X |
| 2,258,948 | 10/1941 | Garrison | 49/386 X |
| 1,628,543 | 5/1927 | Jonsson | 49/40 X |
| 2,160,099 | 5/1939 | Zeligman et al. | 49/40 X |
| 2,528,145 | 10/1950 | Horton | 49/349 X |
| 3,567,209 | 3/1971 | Lathers | 296/50 |

FOREIGN PATENTS OR APPLICATIONS

| | | | |
|---|---|---|---|
| 436,605 | 6/1948 | Italy | 49/40 |

*Primary Examiner*—Dennis L. Taylor
*Attorney*—Warren E. Finken and Dean L. Ellis

[57] ABSTRACT

A control arm pivotally supported on a vehicle body has one end affixed to a closure asymmetrically with respect to the center of gravity of the closure and supports the latter on the vehicle body for generally vertical bodily shiftable movement between open and closed positions relative to an opening in the vehicle body. The control arm is indirectly rigidified by movement synchronizing means which equalize vertical movement of opposite edges of the closure to prevent tilting of the closure and twisting of the control arm.

4 Claims, 8 Drawing Figures

INVENTOR.
Bert R. Wanlass
BY
D. L. Ellis
ATTORNEY

PATENTED OCT 24 1972
3,699,716
SHEET 4 OF 4
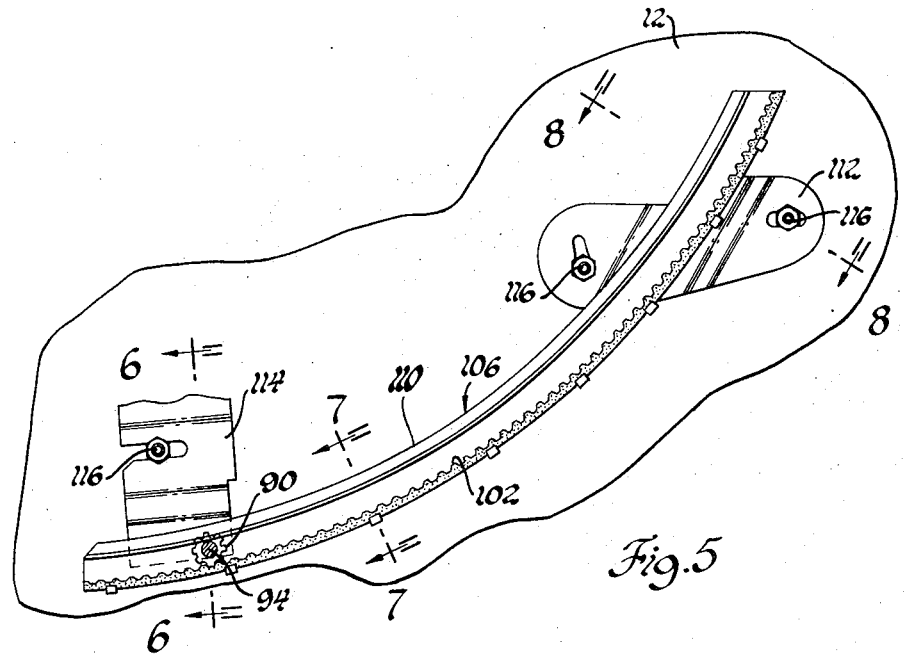
Fig.5
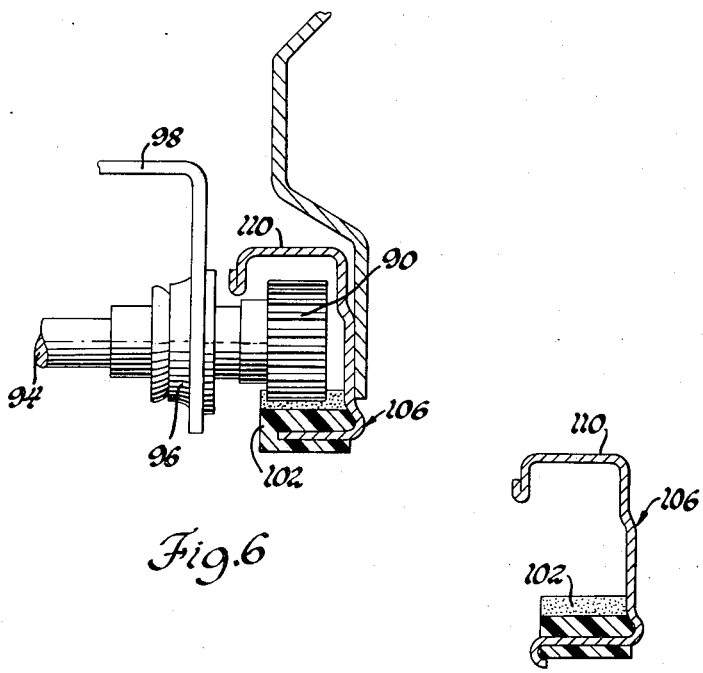
Fig.6
Fig.7
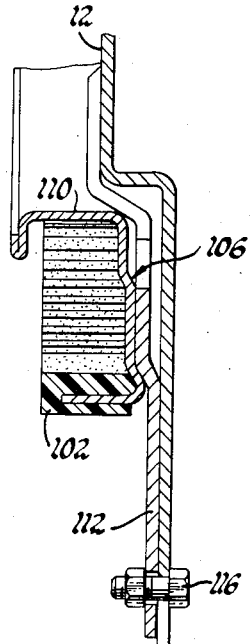
Fig.8
INVENTOR.
Bert R. Wanlass
BY
O. L. Ellis
ATTORNEY

CLOSURE MOUNTING MEANS

This invention relates generally to vehicle body closures and, more particularly, to a closure for the rear access opening in a station wagon type vehicle body.

A station wagon type vehicle on which a tailgate is supported for generally vertical bodily shiftable movement relative to the rear opening in the vehicle body is preferable to a vehicle on which the tailgate is supported for conventional swinging movement because the vehicle with the vertically moving tailgate can be positioned closer to loading platforms and the like to facilitate transfer of cargo to or from the vehicle through the rear opening. Design limitations, however, render difficult the task of reducing to practice a tailgate support arrangement which provides the required vertical movement and which is dependable, easily operable, economical to manufacture, and so compact as not to interfere with the normal operation of the vehicle. In particular, one station wagon design limitation dictates that the spare tire be stored in a vertical orientation at one side of the vehicle body cargo compartment adjacent the rear opening. This limitation, in turn, dictates that the area adjacent the spare tire storage space be kept free of tailgate support linkage when the rear opening is open. One tailgate mounting proposal incorporates support linkage at each side of the tailgate which automatically folds down below the cargo compartment load supporting floor when the tailgate is opened. Such an arrangement is, however, complicated and prohibitively expensive from a manufacturing standpoint. Closure mounting means according to this invention include a simple and economical asymmetrical tailgate support arrangement providing spare tire accessibility and further include movement synchronizing means indirectly rigidifying the asymmetrical support arrangement to prevent tilting of the tailgate.

The primary feature of this invention is that it provides new and improved closure mounting means for a closure adapted to close an opening in a vehicle body, the closure mounting means including means asymmetrically supporting the closure on the vehicle body for bodily shiftable movement between open and closed positions, and movement synchronizing means indirectly rigidifying the asymmetric support means to prevent tilting of the closure in the plane thereof. Another feature of this invention resides in the provision of asymmetric support means including a single control arm pivotally supported on the vehicle body and, in turn, supporting the closure asymmetrically relative to the center of gravity thereof. Yet another feature of this invention resides in the provision of movement synchronizing means including a first synchronizing element adjacent a first edge of the closure and rigidly connected to a similar second synchronizing element adjacent a second and opposite edge of the closure, the first element being actuable in response to movement of the first edge to initiate a corresponding activation of the second element, the second element equalizing incremental movement of the second edge of the closure with that of the first edge of the closure to maintain the latter in a predetermined attitude. A still further feature of this invention resides in the provision of first and second synchronizing elements in the form of a pair of pinions rotatably supported on one of the closure and the vehicle body and interconnected for unitary rotation, the pinions engaging fixed rack teeth on the other of the closure and the vehicle body to equalize incremental movement of the opposite edges of the closure. Still another feature of this invention resides in the provision of stabilizing means associated with the movement synchronizing means to prevent movement of the closure in a direction generally perpendicular to the plane thereof.

These and other features of this invention will be readily apparent from the following specification and from the drawings wherein:

FIG. 1 is a fragmentary partially broken away perspective view of the rear portion of a station wagon type vehicle body incorporating closure mounting means according to this invention;

FIG. 5 is an enlarged partially broken away view of a portion of FIG. 1 and showing a pinion synchronizing element engaging rack teeth on a cam channel member mounted on the vehicle body;

FIG. 6 is an enlarged sectional view taken generally along the plane indicated by lines 6—6 in FIG. 5;

FIG. 7 is an enlarged sectional view taken generally along the plane indicated by lines 7—7 in FIG. 5; and FIG. 8 is an enlarged sectional view taken generally along the plane indicated by lines 8—8 in FIG. 5.

Figure 2:
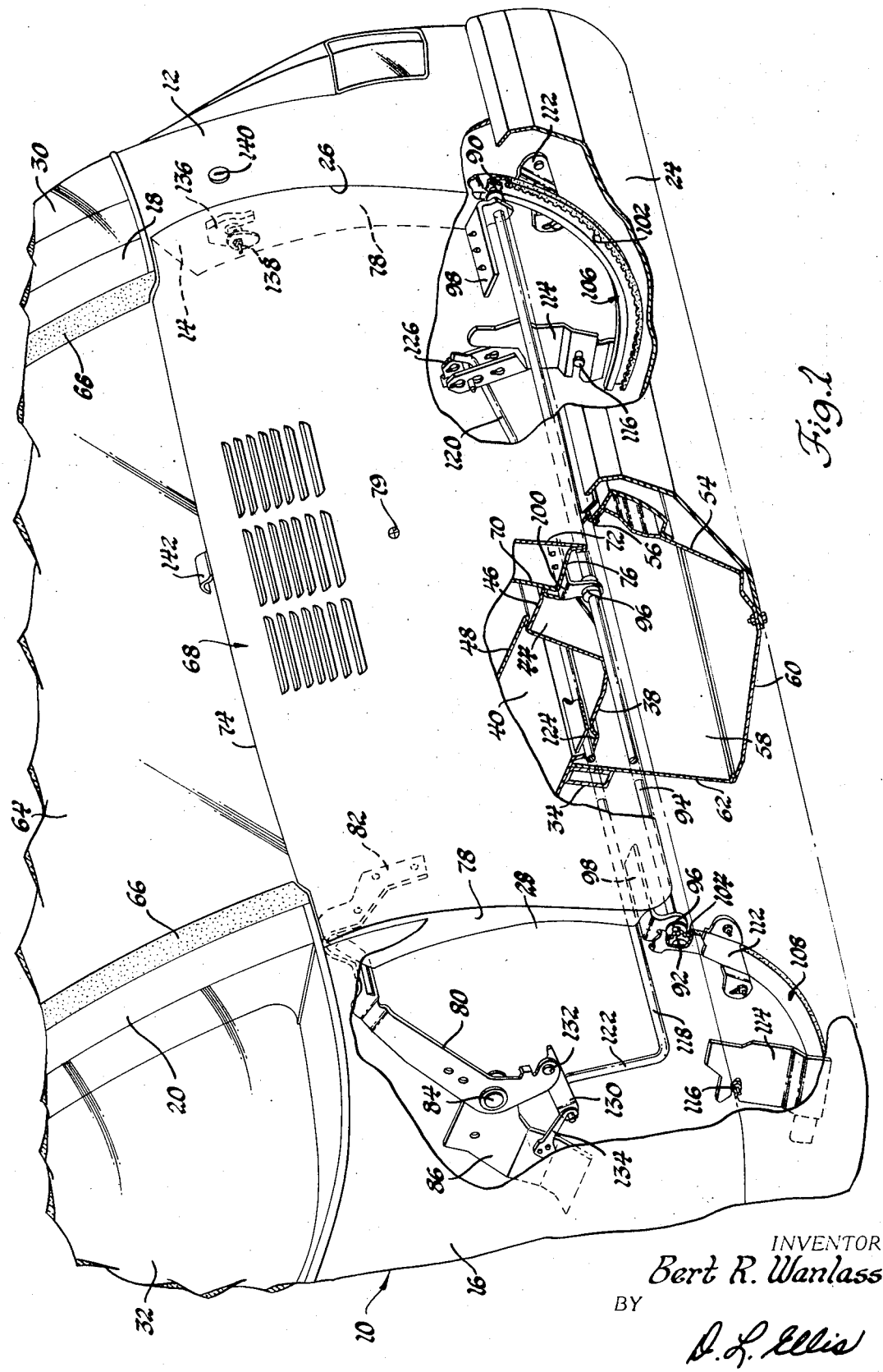
FIG. 2 is a fragmentary partially broken away side elevational view of a station wagon type vehicle body incorporating closure mounting means according to this invention and showing the closure in a raised or closed position.
Figure 3:
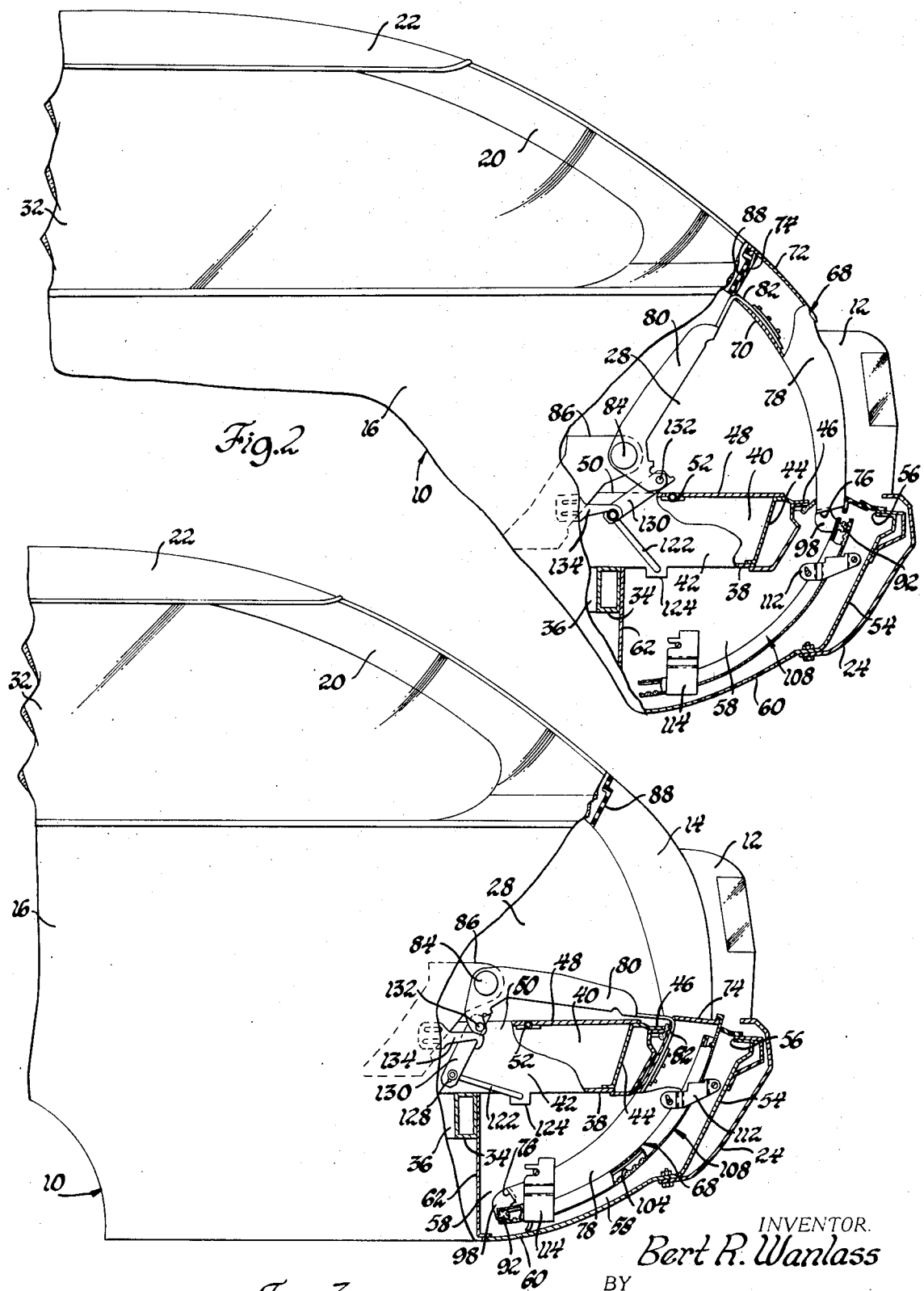
FIG. 3 is similar to FIG. 2 and showing the closure in a lowered or open position.

Referring now to FIGS. 1, 2 and 3 of the drawings, a station wagon type automobile vehicle body designated generally 10 includes a right quarter panel structure 12 defining a jamb 14 and a left quarter panel structure 16 defining a similar jamb, not shown, facing jamb 14. A right body pillar 18 and a left body pillar 20 extend forwardly and upwardly in parallel relation from respective ones of the right and left quarter panel structures to a roof structure 22 of the vehicle body. A bumper member 24 extends transversely of the vehicle body between the quarter panel structures and cooperates with the jambs of the latter, the body pillars and the roof structure in defining a generally rectangular rear opening 26 through which access may be had to a cargo compartment 28 of the vehicle body, FIGS. 2 and 3. A pair of side window panels 30 and 32 are sealingly received within respective ones of a pair of window openings in the vehicle body between the roof structure and the quarter panel structures, each window panel curving generally around the rear of the vehicle body and into sealing engagement with a corresponding one of the body pillars 18 and 20.

Figure 4:
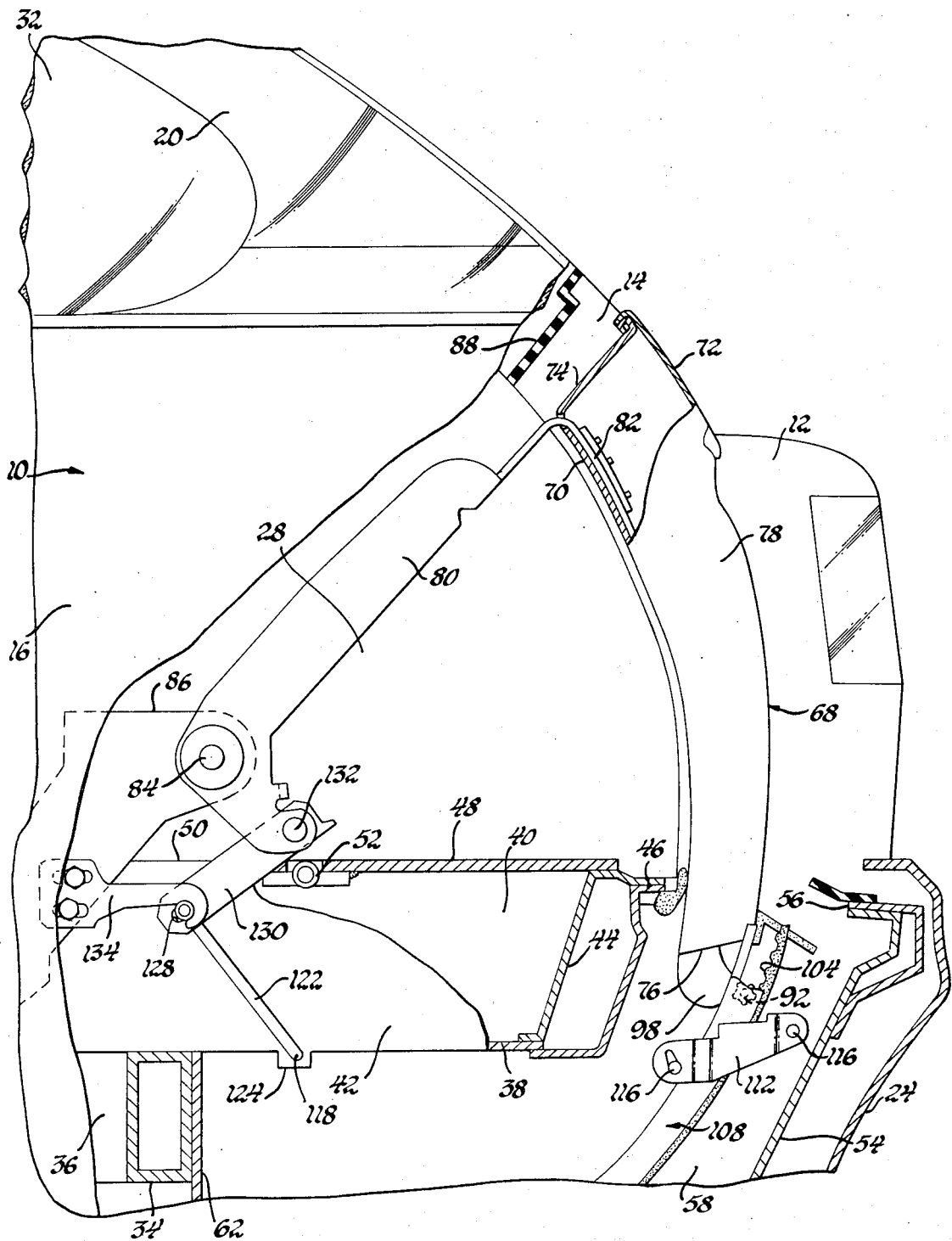
FIG. 4 is an enlarged view similar to FIG. 2 and showing the closure in a released position.

As best seen in FIGS. 1 through 4, the chassis frame supporting the vehicle body 10 is generally conventional and includes a pair of laterally spaced frame rails interconnected adjacent their rearward ends by a lower cross member 34, only left frame rail 36 being shown in FIGS. 2, 3 and 4. A pair of side panel structures extend upwardly from respective ones of the frame rails and cooperate with a lower floor pan 38 in defining a storage space 40 in the vehicle body 10, only left side panel structure 42 being shown in FIGS. 2, 3 and 4. As seen best in FIG. 4, a brace 44 is welded to the rear edge portion of the lower floor pan 38 and cooperates therewith to provide an upper cross member 46. The storage space 40 is opened and closed in a conventional manner by a load floor segment 48 pivotally attached to a fixed load supporting floor 50 by a hinge 52. In a closed position of the load floor segment 48, FIG. 4, the free edge thereof rests generally on the upper cross member 46 to provide a horizontal continuation of the load supporting floor 50 generally at the level of the top of the bumper member 24.

Referring particularly to FIGS. 1 through 4, a rear sill panel 54 extends transversely between the quarter panel structures and is longitudinally spaced rearwardly from the upper cross member 46, the sill panel cooperating with the upper cross member and the jambs of the quarter panel structures 12 and 16 in defining a generally horizontal rectangular opening 56. The sill panel is protected against impacts from rearwardly of the vehicle by the bumper member 24 which is rigidly secured to the frame rails of the vehicle by conventional means, not shown. As seen best in FIGS. 2 and 3, the rectangular opening 56 is situated generally at the top of a storage well 58, the well being located between the quarter panel structures and bounded by the lower floor pan 38, the sill panel 54, a filler plate 60 welded to the sill panel and bolted to the bumper member, and by an end wall 62 welded to the filler plate 60 and to the lower cross member 34.

The upper portion of the rear opening 26 is adapted to be closed by a sliding window panel arrangement, a full and complete description of which appears in the copending application of Charles A. Stebbins, Ser. No. 72,330, filed Sept. 15, 1970 and assigned to the assignee of this invention. Referring particularly to FIG. 1, the sliding window panel arrangement basically includes a rectangular window panel 64 which rigidly supports a roller follower, not shown, generally at each of the four corners thereof. The two roller followers aligned on each vertical side of the window panel engage respective ones of a pair of cam channels, not shown, rigidly secured to the vehicle body within corresponding ones of the body pillars. With the rollers thus engaging the cam channels, the window panel spans the distance between the body pillars and is guided by the cam channels for bodily shiftable movement between a lowered position, FIG. 1, closing the upper portion of the rear opening in sealing engagement with a pair of rubber seals 66 on respective ones of the body pillars and a raised position, not shown, located within the vehicle roof structure remote from the rear opening. Electrically powered drive means, not shown, on the vehicle body function in a conventional manner to selectively move the window panel between the raised and the lowered positions in response to a signal from an operator. The lower portion of the rear opening 26 is adapted to be closed by a closure or tailgate 68 supported on the vehicle body by closure mounting means according to this invention.

As seen best in FIGS. 1 and 4, the tailgate 68 is a generally rectangular hollow shell fabricated from an inner panel 70 and an outer panel 72 hem flanged to the inner panel around the perimeter of the latter, the inner panel defining an upper marginal edge 74, a lower marginal edge 76 and a pair of vertical sides 78 of the tailgate. The tailgate 68 is generally symmetrical about a vertical centerline so that the center of gravity 79 of the tailgate is situated generally at the center thereof.

As seen best in FIGS. 1 through 4, a generally flat, L-shaped control arm 80 having a mounting flange 82 thereon is rotatably supported at 84 on a plate member 86 adjustably fastened to the left quarter panel structure 16. The mounting flange protrudes through an aperture in the tailgate inner panel and is rigidly fastened to the inner surface thereof generally adjacent the left end of upper marginal edge 74. The control arm 80 thus supports the tailgate on the vehicle body for generally vertical bodily shiftable movement between a raised or closed position, FIGS. 1 and 2, wherein the tailgate closes the lower portion of the rear opening 26 with opposite ends of the upper marginal edge 74 thereof in sealing engagement with respective ones of a pair of rubber seals 88 on the lower ends of corresponding ones of the body pillars 18 and 20, and a lowered or open position, FIG. 3, located within the storage well 58 remote from the rear opening.

As seen best in FIG. 1, the control arm 80 supports the tailgate asymmetrically with respect to the center of gravity 79 of the latter so that the right side of the rear opening 26 is unencumbered by linkage which might obstruct access to the spare tire, not shown. As a result, however, the control arm 80 is subjected to a severe turning moment applied thereto by the tailgate at the mounting flange 82 and in the plane of the tailgate. Unless rigidified, the control arm could be twisted under the weight of the tailgate and the latter tilted in the plane thereof and possibly wedged between the jambs on the quarter panel structure.

As seen best in FIG. 1, movement synchronizing means are provided to indirectly rigidify the control arm 80 and include a pair of synchronizing elements in the form of pinions 90 and 92. The pinions are rigidly interconnected for unitary rotary movement by a synchronizer shaft 94. The synchronizer shaft is mounted on the tailgate adjacent the lower marginal edge 76 in a fixed orientation by conventional anti-friction bearing means 96, the latter being supported by a pair of end brackets 98 and a center bracket 100 each rigidly affixed by conventional means to the lower marginal edge of the tailgate.

As best seen in FIGS. 1, 5 and 6, the pinions 90 and 92 meshingly engage, respectively, toothed racks 102 and 104, each rack being rigidly secured to a flange of a respective one of a pair of curved cam channel members 106 and 108. Each cam channel member includes, in addition to the rack supporting flange, a retaining flange 110 extending parallel to the rack and each has rigidly affixed thereto, as by welding, adjacent the upper end a support plate 112 and adjacent the lower end a support plate 114. The support plates 112 and 114 are adjustably mounted, as by bolts 116, on respective ones of the quarter panel structures on opposite sides of the storage well 58, the support plates thereby supporting the cam channels 106 and 108 on the vehicle body in parallel and spaced relation. As described hereinafter, the pinions cooperate with the rack teeth on the cam channels to indirectly rigidify the control arm 80 by synchronizing the vertical movement of the two vertical sides 78 of the tailgate.

A further complication introduced by utilizing only a single control arm is that the stability of the tailgate longitudinally of the vehicle body is reduced. More particularly, with the control arm 80 being rigidly affixed to the tailgate generally at the upper marginal edge 74, the tailgate itself functions as a long lever arm relative to the bend in the control arm adjacent the mounting flange 82. A force applied to the tailgate near the lower marginal edge 76 and directed longitudinally of the vehicle body is multiplied by the lever arm and might well cause bending of the control arm. Such forces need not be large and could be generated merely by normal vibrations set up during movement of the vehicle.

As seen best in FIGS. 1, 5 and 6, the pinions 90 and 92 cooperate with the cam channel members 106 and 108 to stabilize the tailgate longitudinally of the vehicle body. More particularly, with each pinion meshingly engaging a corresponding one of the toothed racks, the retaining flange 110 of the corresponding cam channel member prevents any substantial movement of the pinion away from the rack teeth. By restricting such movement the lower marginal edge 76 of the tailgate is stabilized and inadvertent bending of the control arm is prevented. Ideally, the curvature of the cam channels should define a true arc about a transverse axis of the vehicle body through pivot 84 since the upper marginal edge of the tailgate traverses such an arc. It has, however, been found that the curvature may deviate somewhat from the true arc in order to achieve satisfactory sealing between the vertical sides of the tailgate and vertical seal member, not shown, on the vehicle body, the deviation causing only slight and insignificant bending of the control arm and the tailgate.

Referring particularly now to FIGS. 1 through 4, counterbalance means are provided to facilitate bodily shiftable movement of the tailgate and include a torsion rod 118 having a right angle bend 120 at one end and a crank 122 formed on the other end. The shank portion of the torsion rod between the crank 122 and the bend 120 is rotatably supported on the vehicle body in a well 124 below the lower floor pan 38, FIG. 1. The right angle bend 120 is adjustably captured in a retainer 126 rigidly secured to the right quarter panel structure, the retainer preventing rotation of the right end, FIG. 1, of the torsion rod. As best seen in FIG. 4, the crank 122 of the torsion rod is received within an elongated slot 128 located generally at one end of an intermediate link 130, the other end of the intermediate link being pivotally connected to the short leg of L-shaped control arm 80 at 132. The torsion rod is preloaded in a conventional manner to urge the crank 122 in a clockwise direction, FIGS. 2, 3 and 4, and a hook 134, rigidly affixed to the plate member 86, is positioned in the arcuate path of motion of the crank so that the latter is captured when it achieves a predetermined angular position.

Referring now to FIG. 1 of the drawings, a latch assembly 136 on jamb 14 of the right quarter panel structure 12 engages a striker 138 rigidly affixed to the right vertical side 78 of the tailgate to hold the right side in a vertical position corresponding to the closed position of the tailgate. For a full and detailed description of the latch assembly 136 and the striker 138, reference may be made to the copending application of Bert R. Wanlass and Alfonsas Velavicius, Ser. No. 72,735, filed Sept. 14, 1970 and assigned to the assignee of this invention. With the right side thus restrained, pinion 90 is immobilized by the toothed rack 102 on the channel 106, the synchronizer shaft 94 simultaneously immobilizing the pinion 96 which thus functions to hold the left vertical side 78 of the tailgate at the same height as the right vertical side against the tendency of the left side to sag under the weight of the tailgate. While the tailgate is thus held in the closed position by the latch assembly 136, the crank 122 is captured by the hook 134 and the control arm 80 pulls the intermediate link up to a position, FIG. 2, wherein the crank generally abuts the lower end of the slot 128.

As best seen in FIG. 4, when the latch assembly 136 is actuated to release the striker 138, as by a key inserted into a lock cylinder 140 mounted on the vehicle body, FIG. 1, gravity initiates downward bodily shiftable movement of the tailgate, such movement causing rotation of the control arm and relative movement between the intermediate link and the crank 122, the lost motion between the latter two elements being accommodated by slot 128. The lost motion between the crank and the intermediate link continues until the top of slot 128 engages crank 122, the latter then preventing further rotation of the control arm 80 and defining a released position of the tailgate, FIG. 4, wherein the weight of the latter is insufficient to rotate the crank counterclockwise from its captured position. Referring to FIGS. 1 and 5, it will be apparent that in the released position the control arm 80 supports the left vertical side 78 of the tailgate at a height corresponding to the released position of the tailgate while the pinion 92, the synchronizer shaft 94 and the pinion 90 cooperate with the corresponding toothed racks as described hereinbefore to hold the right vertical side 78 of the tailgate at the same height as the left side against the tendency of the right side to sag under the weight of the tailgate.

With the tailgate in the released position, a gap exists between the upper marginal edge 74 of the latter and the bottom edge of the lowered window panel 64, the gap permitting an operator to manually exert a downward force on the upper marginal edge 74. The downward force, directed by the control arm longitudinally along the intermediate link 130, places the latter in compression and rotates the crank 122 counterclockwise, FIGS. 2, 3 and 4. As the crank is thus rotated the counterbalance force exerted thereby increases to a maximum value in the open position of the tailgate, the force being directed longitudinally along the intermediate link 130. The intermediate link, in turn, imparts a force on the control arm which generates a counterclockwise force couple thereon about pivot 84. The magnitude of the force couple is directly proportional to the perpendicular distance between the longitudinal axis of the intermediate link and the control arm pivot 84. As best seen in FIGS. 2 and 3, as the tailgate is bodily shifted downward from the closed to the open position the longitudinal axis of the intermediate link approaches intersection with the pivot 84. Thus, notwithstanding the fact that the counterbalance force exerted by the torsion rod is maximum in the open position of the tailgate, the force couple generated thereby on the control arm is minimum and insufficient to overcome the opposing force couple generated by the weight of the tailgate. Therefore, the tailgate remains in the open position, FIG. 3, without the use of external latching devices.

During movement of the tailgate, the movement synchronizing means indirectly rigidify the control arm 80 by insuring level descent of the tailgate regardless of where along the upper marginal edge 74 a downward force is applied. More particularly, with reference to FIG. 1, a downward force applied generally at the right end of upper marginal edge 74 is resisted at the left end of the upper marginal edge 74 by the torsion rod 118 through the control arm 80 and the intermediate link 130. The two opposing forces generate a clockwise, force couple, FIG. 1, tending to tilt the tailgate in the plane thereof. Such tilting necessarily implies relative rotation between the pinions 90 and 92 in opposite directions. The synchronizer shaft 94, however, is of predetermined rigidity sufficient to permit virtually zero degrees of relative angular movement or rotation between the pinions so that no tilting of the tailgate is permitted to take place.

To raise the tailgate from the open position, it is necessary only to manually grasp a handle 142 on the tailgate and lift the latter until the force couple exerted on the control arm by the torsion rod is sufficient to overcome the opposing force couple generated by the weight of the tailgate. The tailgate is thereafter raised by the torsion rod until the latter is captured by the hook 134. The operator then merely grasps the handle 142 and lifts the tailgate the remaining distance from the released position to the closed position whereupon latch assembly 136 engages striker 138 to maintain the tailgate in the closed position.

Having thus described the invention, what is claimed is:

1. In a vehicle body having an opening therein, the combination comprising, a closure defining first and second parallel edges, a control arm, means supporting said control arm on said vehicle body for pivotal movement about a transverse axis of said vehicle body, means attaching said control arm to said closure adjacent said first edge, said control arm supporting said closure on said vehicle body asymmetrically with respect to the center of gravity of said closure and for generally vertical bodily shiftable movement in a path between a closed position in said opening and an open position remote from said opening, and movement synchronizing means on said vehicle body and on said closure operable independently of said control arm to equalize incremental shifting movement of said first and said second edges of said closure in said path and thereby prevent tilting of said closure about the attachment of said control arm thereto.

2. The combination as recited in claim 1 further including stabilizing means on said vehicle body and on said closure adjacent a transverse edge of said closure remote from the attachment of said control arm thereto operable to restrict movement of said transverse edge in a direction generally perpendicular to the plane of said closure and to said path thereof between said open and said closed positions.

3. In a vehicle body having an opening therein, the combination comprising, a closure, means attached to said closure asymmetrically with respect to the center of gravity of said closure and supporting the latter on said vehicle body for bodily shiftable movement in a path between a closed position in said opening and an open position remote from said opening, a pair of toothed racks, means rigidly mounting said toothed racks generally on opposite sides of one of said closure and said vehicle body adjacent said opening, a pair of pinion gear synchronizing elements, means rotatably supporting each of said pinion gear synchronizing elements on opposite sides of the other of said closure and said vehicle body adjacent said opening, each of said pinion gear synchronizing elements meshingly engaging a corresponding one of said toothed racks and being rotatable thereby in response to bodily shiftable movement of said closure relative to said vehicle body in said path between said open and said closed position, and synchronizer means rigidly interconnecting each of said pinion gear synchronizing elements for unitary rotation, said rigidly interconnected pinion gear synchronizing elements equalizing incremental shifting movement of a pair of opposite edges of said closure in said path and thereby preventing tilting of said closure about the attachment of said support means thereto.

4. In a station wagon type vehicle body having a transverse rear opening therein, the combination comprising, a generally rectangular closure having upper and lower transverse edges and first and second vertical sides, a control arm, means supporting said control arm on said vehicle body for pivotal movement about a transverse axis of the latter, means attaching said control arm to said closure adjacent said first vertical side, said control arm supporting said closure on said vehicle body asymmetrically with respect to the center of gravity of said closure and for generally vertical bodily shiftable movement in a path between a closed position in said opening and an open position remote from said opening, counterbalance means resiliently urging said closure toward said closed position, a pair of toothed racks, means rigidly mounting each of said toothed racks on said vehicle body generally adjacent opposite sides of said opening therein, a synchronizer shaft, means rotatably mounting said synchronizer shaft on said closure generally adjacent said lower transverse edge of the latter for unitary bodily shiftable movement therewith, a pair of pinion gears, and means rigidly mounting each of said pinion gears on a respective end of said synchronizer shaft for unitary rotation therewith, said pinion gears meshingly engaging corresponding ones of said toothed racks and being rotated by the latter in response to bodily shiftable movement of said closure relative to said vehicle body in said path, said synchronizer shaft equalizing rotation of said pinion gears thereby to equalize incremental movement of said first and said second vertical sides of said closure in said path and prevent tilting of said closure about the attachment of said control arm thereto.

* * * * *